Sept. 22, 1970 M. L. SASSLER 3,530,383
ULTRA-SENSITIVE RECEIVER
Filed Nov. 18, 1966
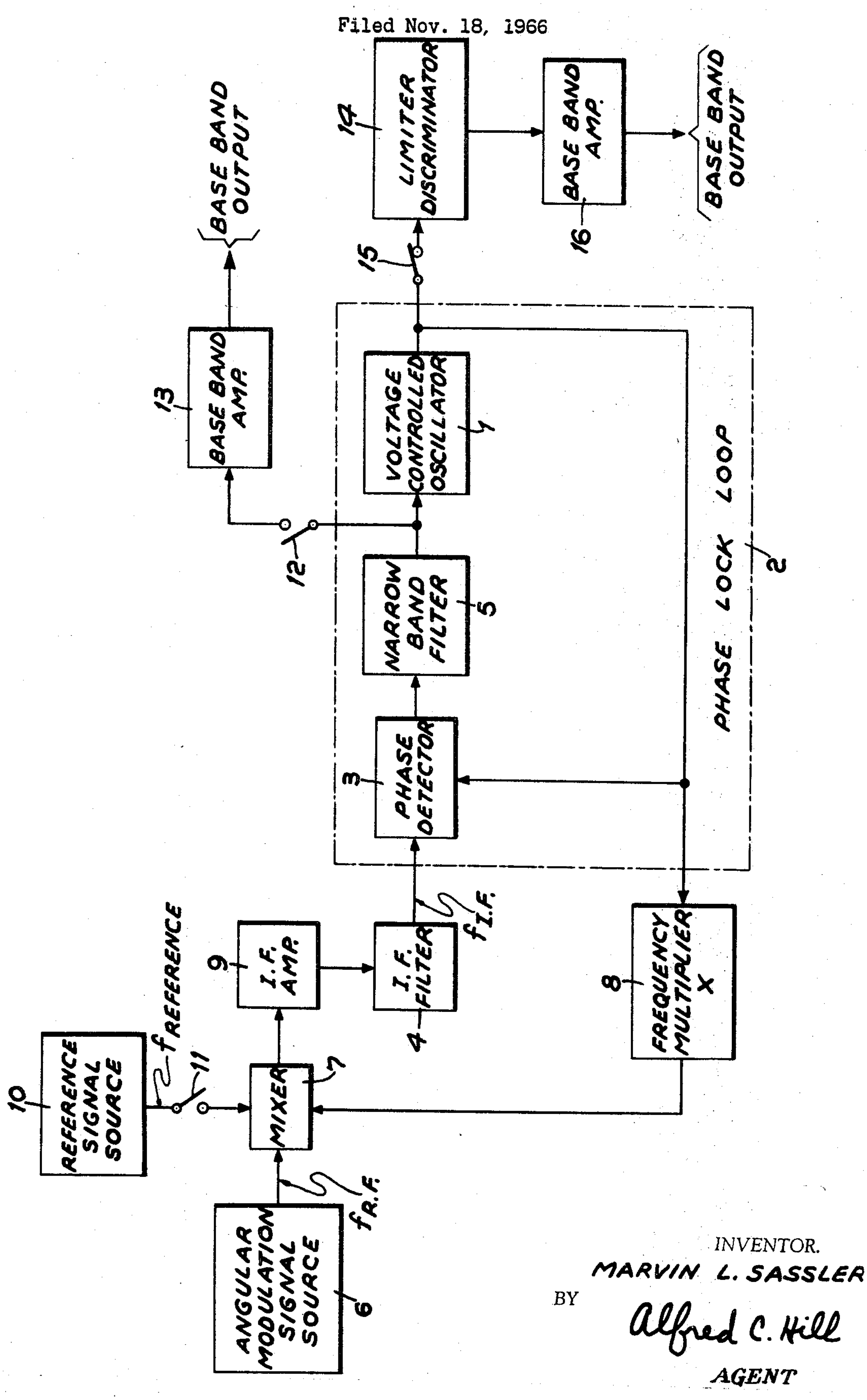
INVENTOR.
MARVIN L. SASSLER
BY Alfred C. Hill
AGENT United States Patent Office 3,530,383

Patented Sept. 22, 1970

3,530,383
ULTRA-SENSITIVE RECEIVER

Marvin L. Sassler, Wayne, N.J., assignor to International Telephone and Telegraph Corporation, Nutley, N.J., a corporation of Maryland Filed Nov. 18, 1966, Ser. No. 595,395
Int. Cl. H04b *1/16*
U.S. Cl. 325—346 5 Claims

ABSTRACT OF THE DISCLOSURE

An angularly modulated receiver employing both frequency compression and phase locked loop techniques. The receiver includes a conventional phase locked loop with the output of the phase locked loop voltage controlled oscillator being coupled to the phase detector of the phase locked loop and in addition to a frequency multiplier whose output is coupled to a mixer which in turn is coupled to the receiver input. The output of the mixer provides the other input to the phase detector of the phase locked loop. An additional reference frequency signal can be coupled to the mixer to give more flexibility in selecting the multiplying factor of the multiplier, the RF signal frequency and the resultant IF signal frequency to enable adjustment of the receiver sensitivity.

This invention relates to radio receivers and more particularly to an ultra-sensitive angular modulation receiver.

In the present state of communication art, particularly long range communication, such as over-the-horizon and space communication systems, there is an ever present search for means and methods of obtaining high quality, reliable performance. To this end wideband angular modulation communication systems, such as frequency modulation (FM) communication systems, are being employed since these systems have an inherently high reliability due to their immunity to noise. As is well known an angular modulation receiver is characterized by a threshold point, above which signal-to-noise ratio of the demodulated intelligence increases linearly with the received signal level. Below this threshold point, there is very rapid deterioration of signal-to-noise ratio as the received signal level falls. This threshold level, therefore, determines the point at which the angular modulation communication system fails. As is known, it is a characteristic of angular modulation systems that bandwidth can be traded for signal-to-noise ratio, that is, an increase in signal-to-noise ratio requires an increase in bandwidth. This generally results in an increase in the threshold point. To prevent this increase in the threshold point, it is necessary to increase the carrier power. In any communication system where the received signal may drop below the threshold point, system reliability, that is, the maintaining of the received signal above the threshold point for a given percent of time, was originally obtained by increased transmitter power, increased antenna diameter and/or delivery receiving systems. Recently, more economical arrangements have been employed to improve the reliability of angular modulation communication systems. These arrangements operate to lower the threshold point of the angular modulation receiver, that is, provide threshold extension. This will enhance the reliability since the receiver can respond to a signal which has a poorer signal-to-noise ratio than heretofore. Also, for a given reliability specification, the same arrangements will enable a reduction of the transmitter power requirement.

In general threshold extension has been obtained by reducing the effective bandwidth of the angular modulation receiver, or in other words, a reduction of the modulation index of the signal, after the radio frequency (RF) amplifier, in the intermediate frequency (IF) section of the receiver. This reduction of effective bandwidth reduces the receiver noise and, hence, improves the signal-to-noise ratio of the receiver carrier in the IF pass band. Therefore, since the threshold point depends on the signal-to-noise ratio of the receiver carrier in the IF section of the receiver, reduction of noise at that point will lower the threshold point. Thus, with the lower threshold point the receiver will respond to signals having a lower signal-to-noise ratio.

One such technique has been termed "frequency compression." This technique consists of transforming a wideband angular modulation signal of high modulation index into a narrow band angular modulation signal of low modulation index in the receiver before demodulation takes place. This is accomplished by using the demodulated baseband output (modulation signal) of the angular modulation receiver to angularly modulate the local oscillator so that the instantaneous local oscillator frequency follows the instantaneous incoming signal frequency. The resultant IF deviation is then considerably less than the incoming RF deviation. The high modulation index signal entering the receiver provides the usual and desirable angular modulation improvement resulting in a high baseband signal-to-noise ratio.

Another technique for threshold extension employs a "phase locked loop" which operates to maintain the output of an oscillator in frequency synchronism and in substantially constant phase relationship with the incoming signal, thereby permitting the utilization of an extremely narrow bandwidth filter which excludes a major portion of the noise that may be received along with the signal.

An object of this invention is to provide an angular modulation receiver which is more sensitive than an angular modulation receiver employing either the "frequency compression" or "phase lock loop" techniques.

Another object of this invention is to provide a broadband angularly modulated receiver permitting realization of the angular modulation improvement of the broadband receiver and providing a threshold point equivalent to a narrow band system incorporating both "frequency compression" and "phase lock loop" techniques.

A feature of this invention is the provision of an ultra-sensitive angular modulation receiver comprising a source of angular modulation signal, a voltage controlled oscillator, first means coupled to the oscillator to lock the frequency thereof to a given angular modulation input signal, and second means coupled to the oscillator and the source to provide the given input signal for the first means, said first means and said second means cooperating to compress the frequency spectrum of the angular modulation signal of the source to increase the sensitivity of the receiver.

Another feature of this invention is the incorporation in the above-mentioned ultra-sensitive angular modulation receiver of a source of reference signal coupled to the second means to render more flexible the amount of frequency compression obtainable with the second means.

Other features of this invention are the provision of an arrangement coupled to the input of the voltage controlled oscillator to recover the modulation signal of the compressed angular modulation signal, or an arrangement coupled to the output of the voltage controlled oscillator to recover the modulation signal from the compressed angular modulation signal.

The above mentioned and other features and objects of this invention will become more apparent by reference to the following description taken in conjunction with the accompanying drawing, in which the single figure of the drawing illustrates a block diagram of the receiver in accordance with the principles of this invention.

Referring to the figure, the receiver in accordance with the principles of this invention incorporates voltage controlled oscillator 1 in phase lock loop 2 which in cooperation with phase detector 3 provides a comparison of the phase of the signal at the output of filter 4 with the phase of the signal at the output of oscillator 1 to provide an output signal from detector 3 which is substantially the modulation signal of the signal from filter 4. The output of the detector 3 is coupled through a narrow band filter 5 which strips a major portion of the noise from the modulation signal at the output of detector 3. This resultant signal is employed to control the frequency of oscillator 1 so that the frequency output of oscillator 1 follows the frequency of the signal at the output of filter 4 in a manner to compress the frequency deviation and provide the threshold extension advantage of phase lock loop 2.

The wideband deviation signal from source 6 is coupled to mixer 7 which has its other input coupled to frequency multiplier 8. Multiplier 8 has its input coupled to the output of oscillator 1 of loop 2. According to the multiplication factor of multiplier 8 the signal at the output of mixer 7 will be compressed to provide a narrow band or compressed deviation angular modulation signal which is coupled through IF amplifier 9 to the input of filter 4 whose output provides one of the input signals to phase detector 3 of phase lock loop 2.

The relationship between the signal input to mixer 7 and the signal output from filter 4 is expressed by the following equation:

$$f_{RF}=(X\pm1)f_{IF}$$

where $f_{RF}$ is equal to the frequency of the RF input to mixer 7, $f_{IF}$ is equal to the frequency of the IF output of filter 4, X is the multiplication factor of multiplier 8, and the term $(X\pm1)$ is the compression factor achieved by employing multiplier 8. It will be appreciated that the expression above rigidly determines the multiplication factor X for a given value of RF and IF frequencies. To provide more flexibility in the selection of the radio frequency and intermediate frequency, as well as the multiplication factor, a reference frequency signal from source 10 is coupled to mixer 7 when switch 11 is closed thereby providing three inputs to mixer 7, namely, an input from source 10, an input from source 6 and an input from multiplier 8. With this arrangement the following equation expresses the relationship between the various signals and the multiplying factor:

$$f_{RF}=(X\pm1)f_{IF}\pm f_{ref}$$

where $f_{ref}$ is equal to the frequency of the reference signals and the other parameters are as described above. It is immediately apparent that there is more flexibility in selection of the parameters of the system.

The baseband or modulation signal can be recovered in the receiver of this invention by closing switch 12 which connects baseband amplifier 13 to the output of filter 5. The reason that the modulation signal can be recovered at this point is due to the fact that the output of filter 5 is the modulation signal of the angular modulation signal at the output of filter 4 due to the action of phase detector 3.

While it is possible to recover the baseband signal as indicated above by coupling amplifier 13 to the output of filter 5 the signal-to-noise improvement is not the best obtainable due to spurious frequency components at the output of filter 5 that are unchangeable and tend to reduce the signal-to-noise ratio. On the other hand, if limiter discriminator 14 is coupled to the output of oscillator 1 by means of switch 15 there is obtained the best possible signal-to-noise ratio at the output of discriminator 14 since the discriminator converts the spurious frequency components at the output of filter 5 to D.C. components due to the derivative action of limiter discriminator 14. This action removes the reduction of the signal-to-noise ratio caused by these spurious components at the output of filter 5. The baseband output of limiter discriminator 14 is amplified in baseband amplifier 16.

While I have described above the principles of my invention in connection with specific apparatus it is to be clearly understood that this description is made only by way of example and not as a limitation to the scope of my invention as set forth in the objects thereof and in the accompanying claims.

I claim:

1. An ultra-sensitive angular modulation receiver comprising:
- a source of angular modulation signal;
- a mixer having one of its inputs coupled to said source;
- a phase detector having one of its inputs coupled to the output of said mixer;
- a narrow band filter coupled to the output of said detector;
- a voltage controlled oscillator coupled to the output of said filter and the other input of said detector providing an output signal having a center frequency divided in step with the output signal of said filter;
- a frequency multiplier directly connected between the output of said oscillator and the other input of said mixer;
- said frequency multiplier multiplying the center frequency and frequency deviation of said output signal of said oscillator by a predetermined factor greater than one to increase the compression of the frequency spectrum of said angular modulation signal of said source and thereby provide an increase in the sensitivity of said receiver; and
- third means coupled to said oscillator to recover the modulation signal from said output signal.

2. An ultra-sensitive angular modulation receiver comprising:
- a source of angular modulation signal;
- a voltage controlled oscillator;
- first means coupled to said oscillator to lock the frequency thereof to a given angular modulation input signal;
- second means directly connected to the output of said oscillator and said source to provide said given input signal;
- said first and second means cooperating to compress the frequency spectrum of said angular modulation signal of said source to increase the sensitivity of said receiver; and
- third means coupled to the output of said oscillator to recover the modulation signal from said compressed angular modulation signal.

3. A receiver according to claim 1, wherein said third means includes
a limiter-discriminator.

4. A receiver according to claim 3, further including a source of reference signal coupled to said mixer.

5. A receiver according to claim 1, further including a source of reference signal coupled to said mixer.

References Cited

UNITED STATES PATENTS 3,371,281 2/1968 Powell ............ 325—346

KATHLEEN H. CLAFFY, Primary Examiner

B. P. SMITH, Assistant Examiner